US009182905B2

(12) United States Patent
Lee et al.

(10) Patent No.: US 9,182,905 B2
(45) Date of Patent: Nov. 10, 2015

(54) METHOD FOR INPUTTING COMMAND IN MOBILE TERMINAL USING DRAWING PATTERN AND MOBILE TERMINAL USING THE SAME

(75) Inventors: Sang Hyuck Lee, Seoul (KR); Yoo Sun Shon, Seoul (KR); Doo Whan Sang, Seoul (KR); Ji Woon Kim, Seoul (KR); Woo Jin Suh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 138 days.

(21) Appl. No.: 12/756,141

(22) Filed: Apr. 7, 2010

(65) Prior Publication Data
US 2010/0262591 A1 Oct. 14, 2010

(30) Foreign Application Priority Data

Apr. 8, 2009 (KR) .................. 10-2009-0030523

(51) Int. Cl.
G06F 3/033 (2013.01)
G06F 3/048 (2013.01)
G06F 3/0488 (2013.01)
G06F 3/01 (2006.01)
G06F 3/0484 (2013.01)

(52) U.S. Cl.
CPC .......... *G06F 3/04883* (2013.01); *G06F 3/017* (2013.01); *G06F 3/04842* (2013.01)

(58) Field of Classification Search
CPC .......... G06F 3/01; G06F 17/30; G06F 3/017; G06F 3/04842
USPC ...................... 715/863, 847, 812; 345/179
See application file for complete search history.

(56) References Cited

U.S. PATENT DOCUMENTS

| 5,347,295 A | * | 9/1994 | Agulnick et al. | 345/156 |
| 5,414,228 A | * | 5/1995 | Yamashita | 345/17 |
| 5,500,937 A |   | 3/1996 | Thompson-Rohrlich | |
| 5,502,803 A | * | 3/1996 | Yoshida et al. | 715/201 |
| 5,583,543 A | * | 12/1996 | Takahashi et al. | 345/173 |
| 5,655,136 A |   | 8/1997 | Morgan | |
| 5,809,267 A | * | 9/1998 | Moran et al. | 715/863 |
| 5,850,531 A | * | 12/1998 | Cox et al. | 715/781 |

(Continued)

FOREIGN PATENT DOCUMENTS

| CN | 201051251 | 4/2008 |
| KR | 10-2009-0022465 | 3/2009 |

(Continued)

OTHER PUBLICATIONS

Henrik Nilsen Omma, Mouse Tweaks, Jun. 27, 2008, wiki.ubuntu.com/Accessibility/Specs/MouseTweaks.*

(Continued)

*Primary Examiner* — Jennifer To
*Assistant Examiner* — Li Sun
(74) *Attorney, Agent, or Firm* — Lee, Hong, Degerman, Kang & Waimey

(57) ABSTRACT

The present disclosure is related to a method of inputting a command in a mobile terminal comprising; storing a table including at least one drawing pattern and a command on the each drawing pattern; receiving a user drawing on a touch screen; and determining a drawing pattern matching with the user drawing pattern by comparing the user drawing pattern and the table to execute a command corresponding the determined drawing pattern, and a mobile terminal using the same.

18 Claims, 10 Drawing Sheets

(56) References Cited

U.S. PATENT DOCUMENTS

| | | | |
|---|---|---|---|
| 5,961,570 A * | 10/1999 | Inamori | 701/538 |
| 6,057,845 A * | 5/2000 | Dupouy | 715/863 |
| 6,333,995 B1 * | 12/2001 | Perrone | 382/187 |
| 6,760,746 B1 * | 7/2004 | Schneider | 709/203 |
| 2001/0048774 A1 * | 12/2001 | Seki et al. | 382/305 |
| 2002/0141643 A1 | 10/2002 | Jaeger | |
| 2003/0046087 A1 * | 3/2003 | Johnston et al. | 704/275 |
| 2003/0065505 A1 * | 4/2003 | Johnston et al. | 704/9 |
| 2006/0101354 A1 * | 5/2006 | Hashimoto et al. | 715/863 |
| 2006/0294189 A1 * | 12/2006 | Natarajan et al. | 709/206 |
| 2008/0244468 A1 * | 10/2008 | Nishihara et al. | 715/863 |
| 2008/0250012 A1 * | 10/2008 | Hinckley et al. | 707/5 |
| 2008/0294982 A1 * | 11/2008 | Leung et al. | 715/261 |
| 2009/0058820 A1 | 3/2009 | Hinckley | |
| 2010/0169842 A1 * | 7/2010 | Migos | 715/863 |

FOREIGN PATENT DOCUMENTS

| | | |
|---|---|---|
| WO | 94/15272 | 7/1994 |
| WO | 2004/031933 | 4/2004 |
| WO | 2004/111816 | 12/2004 |

OTHER PUBLICATIONS

Will Thimbleby & Harold Thimbleby, A novel gesture-based calculator and its design principles, Jul. 2005, Department of Computer Science, University of Wales Swansea.*

European Patent Office Application Serial No. 10003780.3, Search Report dated Apr. 25, 2013, 6 pages.

Thimbleby et al., "A novel gesture-based calculator and its design principles", Royal Society Summer Exhibition, Dec. 2005, 4 pages.

Korean Intellectual Property Office Application Serial No. 10-2009-0030523, Office Action dated Dec. 29, 2014, 4 pages.

* cited by examiner

| PATTERN | | COMMAND |
|---|---|---|
| 11 | × | MULTIPLICATION |
| 12 | ▭ | SEARCH |
| 13 | ☁ | LCD BRIGHTNESS DECREASE |
| 14 | ☼ | LCD BRIGHTNESS INCREASE |
| 15 | ▭ | FOLDER GENERATION |
| 16 | ∨ | SPACING |
| 17 | ● | CHARACTER REMOVAL |
| 18 | ✕ | PAGE REMOVAL |
| 19 | ∧ | NO SPACE |
| 20 | ? | HELP MODE |

METHOD FOR INPUTTING COMMAND IN MOBILE TERMINAL USING DRAWING PATTERN AND MOBILE TERMINAL USING THE SAME

CROSS-REFERENCE TO RELATED APPLICATIONS

Pursuant to 35 U.S.C. §119(a), this application claims the benefit of earlier filing date and right of priority to Korean Patent Application No. 10-2009-0030523, filed on Apr. 8, 2009, the contents of which are hereby incorporated by reference herein in its entirety.

BACKGROUND OF THE DISCLOSURE

1. Field

The present disclosure relates to a method for inputting a command in a mobile terminal and a mobile terminal using the same.

2. Background

Generally, terminals can be classified into mobile/portable terminals and stationary terminals. The mobile terminals can be further classified into handheld terminals and vehicle mount terminals according to possibility of user's direct portability.

As functions of the terminal are diversified, the terminal is implemented as a multimedia player provided with composite functions such as photographing of photos or moving pictures, playback of music or moving picture files, game play, broadcast reception and the like, for example.

To support and increase the terminal functions, the improvement of structural parts and/or software parts of the terminal may be considered.

Moreover, the mobile terminal has used the plurality of the input devices, and the producers have made an effort to provide the user with the convenient UI.

SUMMARY

Accordingly, an object of the present disclosure is to provide a method of inputting a command in a mobile terminal, the method comprising: storing a table including at least one drawing pattern and a command on the each drawing pattern; receiving a user drawing on a touch screen; and determining a drawing pattern matching with the user drawing pattern by comparing the user drawing pattern and the table to execute a command corresponding the determined drawing pattern.

In some exemplary embodiments, the step of receiving a user drawing on a touch screen, comprises inputting a search word by handwriting on the touch screen, and inputting a drawing for executing a search engine, and the step of determining a drawing pattern matching with the user drawing pattern by comparing the user drawing pattern and the table to execute a command corresponding to the determined drawing pattern, comprises displaying a item related to the search word by executing the search engine on the search word.

In some exemplary embodiments, the step of receiving a user drawing on a touch screen, comprises inputting a search word by handwriting on the touch screen, and inputting a drawing for executing a search engine, and the step of determining a drawing pattern matching with the user drawing pattern by comparing the user drawing pattern and the table to execute a command corresponding the determined drawing pattern, comprises displaying a previously stored item related to the search word by progressing an internet search on the search word.

In some exemplary embodiments, the step of receiving a user drawing on a touch screen, comprises drawing a folder on the touch screen and the step of determining a drawing pattern matching with the user drawing pattern by comparing the user drawing pattern and the table to execute a command corresponding the determined drawing pattern, comprises generating the drawn folder.

In some exemplary embodiments, the step of receiving a user drawing on a touch screen, comprises drawing a revision symbol on a text displayed on the touch screen and the step of determining a drawing pattern matching with the user drawing pattern by comparing the user drawing pattern and the table to execute a command corresponding the determined drawing pattern, comprises changing the displayed text according to the revision symbol.

In some exemplary embodiments, the step of receiving a user drawing on a touch screen, comprises drawing a specific pattern on a file displayed on the touch screen and the step of determining a drawing pattern matching with the user drawing pattern by comparing the user drawing pattern and the table to execute a command corresponding the determined drawing pattern, comprises executing the file according to the specific pattern.

In some exemplary embodiments, the step of receiving a user drawing on a touch screen, comprises drawing a specific pattern for controlling brightness of the display unit in the mobile terminal, and the step of determining a drawing pattern matching with the user drawing pattern by comparing the user drawing pattern and the table to execute a command corresponding the determined drawing pattern, comprises controlling the brightness of the display unit based on the specific pattern.

In some exemplary embodiments, the step of storing a table including at least one drawing pattern and a command on the each drawing pattern, comprises inputting a drawing pattern, and setting up a command on the drawing pattern through a user input unit.

Moreover, another object of the present disclosure is to provide a mobile terminal comprising: a memory configured to store a table including at least one drawing pattern and a command on the each drawing pattern; a touch screen configured to receive a user drawing; and a controller configured to determine a drawing pattern matching with the user drawing pattern by comparing the user drawing pattern and the table to execute a command corresponding the determined drawing pattern.

In some exemplary embodiments, the user drawing includes a search word drawing and a search engine drawing for executing a search engine, and the controller controllably to display a item related to the search word on the touch screen by executing the search engine on the search word, if the search word drawing and the search engine drawing is inputted through the touch screen.

In some exemplary embodiments, the mobile terminal further comprises a wireless communication module configured to access an internet, wherein, the user drawing includes a search word drawing and a search engine drawing for executing a search engine, and the controller controllably to activate the wireless communication module by executing the search engine, and then to display an internet information related to the search word on the touch screen.

In some exemplary embodiments, the user drawing includes a folder drawing and the controller controllably to generate the drawn folder if the folder drawing is inputted through the touch screen.

In some exemplary embodiments, the user drawing includes a revision symbol drawing on a text, and the controller controllably to change the text according to the inputted revision symbol, if the revision symbol is inputted through the touch screen.

In some exemplary embodiments, the user drawing includes an execution drawing on a file, and the controller controllably to executing the file, if the execution drawing is inputted through the touch screen.

In some exemplary embodiments, the user drawing includes a brightness control drawing on a brightness of the touch screen, and the controller controls the brightness of the touch screen, if the brightness control drawing is inputted through the touch screen.

In some exemplary embodiments, the controller stores a drawing pattern on the table by the user's appointment if the drawing pattern is inputted from the touch screen.

Moreover, another object of the present disclosure is to provide a mobile terminal comprising: a memory configured to store a table including at least two drawing patterns and a command on the each drawing pattern; a touch screen configured to receive a first user drawing and a second user drawing; and a controller configured to determine a first drawing pattern matching with the first user drawing pattern by comparing the user first drawing pattern and the table to execute a first command corresponding the determined first drawing pattern, and determine a second drawing pattern matching with the second user drawing pattern by comparing the second first drawing pattern and the table to execute a second command corresponding the determined second drawing pattern, if the second user drawing is received within predetermined time.

In some exemplary embodiments, the first user drawing is a search word drawing and the second user drawing is an internet search drawing.

In some exemplary embodiments, the first user drawing is an arithmetic drawing and the second user drawing is a calculating drawing.

In some exemplary embodiments, the controller is configured to remove the display of the second icon and display the first icon if the second multi touch gesture is inputted.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably.

Embodiments of the present disclosure may be applicable to various types of terminals. Examples of such terminals may include mobile terminals as well as stationary terminals, such as mobile phones, user equipment, smart phones, DTV, computers, digital broadcast terminals, personal digital assistants, portable multimedia players (PMP) and/or navigators.

A further description may be provided with regard to a mobile terminal, although such teachings may apply equally to other types of terminals.

Figure 1:
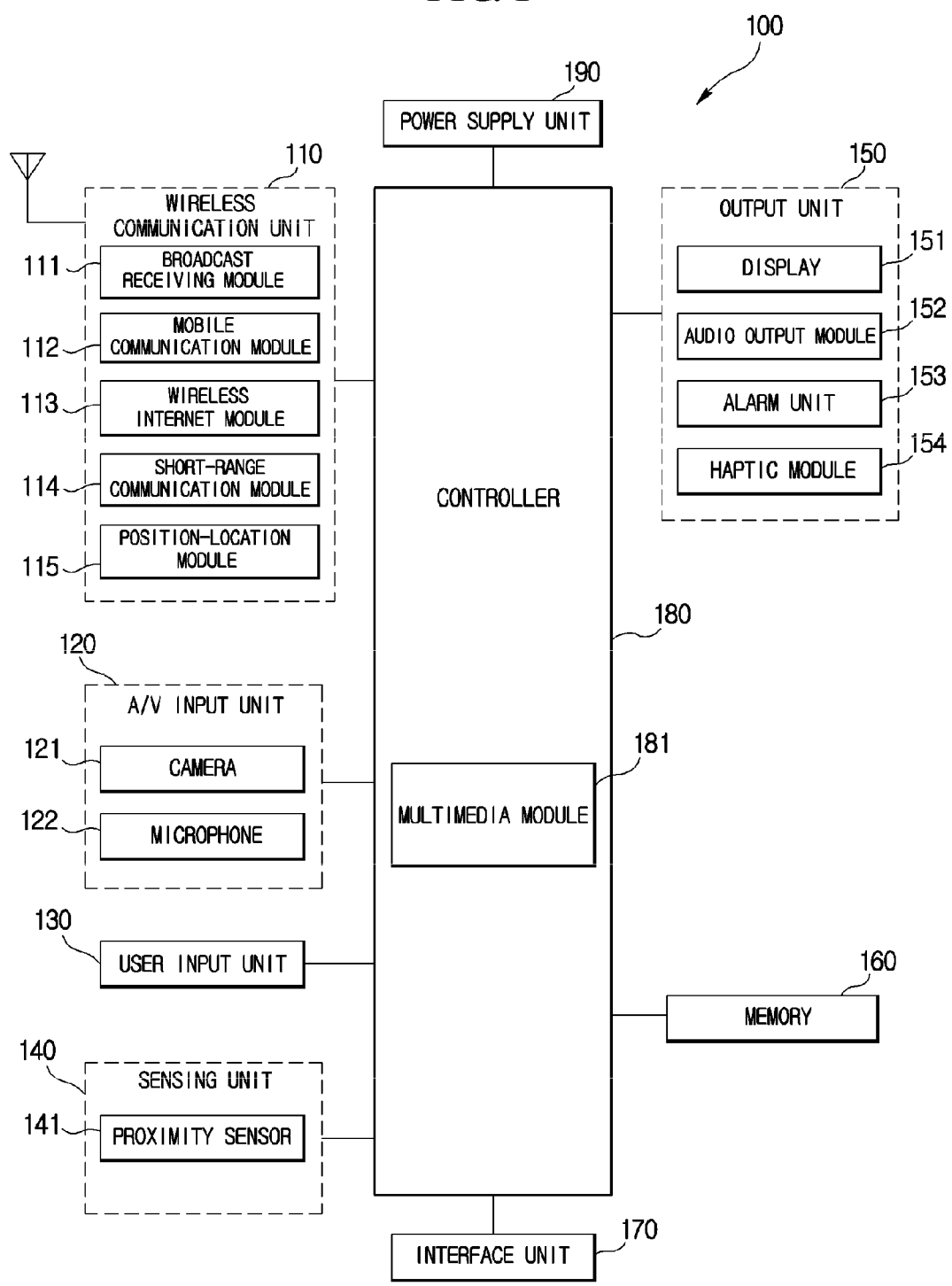
FIG. 1 is a block diagram of a mobile terminal in accordance with an example embodiment of the present disclosure.

FIG. 1 is a block diagram of a mobile terminal in accordance with an example embodiment. Other embodiments and arrangements may also be provided. FIG. 1 shows a mobile terminal 100 having various components, although other components may also be used. More or less components may alternatively be implemented.

FIG. 1 shows that the mobile terminal 100 includes a wireless communication unit 110, an audio/video (A/V) input unit 120, a user input unit 130, a sensing unit 140, an output unit 150, a memory 160, an interface unit 170, a controller 180 and a power supply 190.

The wireless communication unit 110 may be configured with several components and/or modules. The wireless communication unit 110 may include a broadcast receiving module 111, a mobile communication module 112, a wireless Internet module 113, a short-range communication module 114 and a position-location module 115. The wireless communication unit 110 may include one or more components that permit wireless communication between the mobile terminal 100 and a wireless communication system or a network within which the mobile terminal 100 is located. In case of non-mobile terminals, the wireless communication unit 110 may be replaced with a wire communication unit. The wireless communication unit 110 and the wire communication unit may be commonly referred to as a communication unit.

The broadcast receiving module 111 may receive a broadcast signal and/or broadcast associated information from an external broadcast managing entity via a broadcast channel. The broadcast channel may include a satellite channel and a terrestrial channel. The broadcast managing entity may refer to a system that transmits a broadcast signal and/or broadcast associated information.

At least two broadcast receiving modules 111 may be provided in the mobile terminal 100 to pursue simultaneous reception of at least two broadcast channels or facilitation of broadcast channel switching.

Examples of broadcast associated information may include information associated with a broadcast channel, a broadcast program, a broadcast service provider, etc. For example, broadcast associated information may include an electronic program guide (EPG) of digital multimedia broadcasting (DMB) and an electronic service guide (ESG) of digital video broadcast-handheld (DVB-H).

The broadcast signal may be a TV broadcast signal, a radio broadcast signal, and/or a data broadcast signal. The broadcast signal may further include a broadcast signal combined with a TV or radio broadcast signal.

The broadcast receiving module 111 may receive broadcast signals transmitted from various types of broadcast systems. As a non-limiting example, the broadcasting systems may include digital multimedia broadcasting-terrestrial (DMB-T), digital multimedia broadcasting-satellite (DMB-S), digital video broadcast-handheld (DVB-H), a data broadcasting system known as media forward link only (MEDIA-FLO®) and integrated services digital broadcast-terrestrial (ISDB-T). The receiving of multicast signals may also be provided. Data received by the broadcast receiving module 111 may be stored in the memory 160, for example.

The mobile communication module 112 may communicate wireless signals with one or more network entities (e.g. a base station or Node-B). The signals may represent audio, video, multimedia, control signaling, and data, etc.

The wireless Internet module 113 may support Internet access for the mobile terminal 100. This wireless Internet module 113 may be internally or externally coupled to the mobile terminal 100. Suitable technologies for wireless Internet may include, but are not limited to, WLAN (Wireless LAN)(Wi-Fi), Wibro (Wireless broadband), Wimax (World Interoperability for Microwave Access), and/or HSDPA (High Speed Downlink Packet Access). The wireless Internet module 113 may be replaced with a wire Internet module in non-mobile terminals. The wireless Internet module 113 and the wire Internet module may be referred to as an Internet module.

The short-range communication module 114 may facilitate short-range communications. Suitable technologies for short-range communication may include, but are not limited to, radio frequency identification (RFID), infrared data association (IrDA), ultra-wideband (UWB), as well as networking technologies such as BLUETOOTH® and ZIGBEE®.

The position-location module 115 may identify or otherwise obtain a location of the mobile terminal 100. The position-location module 115 may be provided using global positioning system (GPS) components that cooperate with associated satellites, network components, and/or combinations thereof.

The position-location module 115 may precisely calculate current 3-dimensional position information based on longitude, latitude and altitude by calculating distance information and precise time information from at least three satellites and then by applying triangulation to the calculated information. Location and time informations may be calculated using three satellites, and errors of the calculated location position and time informations may then be amended or changed using another satellite. The position-location module 115 may calculate speed information by continuously calculating a real-time current location.

The audio/video (A/V) input unit 120 may provide audio or video signal input to the mobile terminal 100. The A/V input unit 120 may include a camera 121 and a microphone 122. The camera 121 may receive and process image frames of still pictures and/or video.

The microphone 122 may receive an external audio signal while the mobile terminal is in a particular mode, such as a phone call mode, a recording mode and/or a voice recognition mode. The received audio signal may then be processed and converted into digital data.

The mobile terminal 100, and in particular, the A/V input unit 120, may include a noise removing algorithm (or noise canceling algorithm) to remove noise generated in the course of receiving the external audio signal. Data generated by the A/V input unit 120 may be stored in the memory 160, utilized by the output unit 150, and/or transmitted via one or more modules of the wireless communication unit 110. Two or more microphones and/or cameras may also be provided.

The user input unit 130 may generate input data responsive to user manipulation of an associated input device or devices. Examples of such devices may include a keypad, a dome switch, a touchpad (e.g., static pressure/capacitance), a jog wheel and/or a jog switch. A specific example is one in which the user input unit 130 is configured as a touchpad in cooperation with a display, as will be described below.

The sensing unit 140 may provide status measurements of various aspects of the mobile terminal 100. For example, the sensing unit 140 may detect an open/close status (or state) of the mobile terminal 100, a relative positioning of components (e.g., a display and a keypad) of the mobile terminal 100, a change of position of the mobile terminal 100 or a component of the mobile terminal 100, a presence or absence of user contact with the mobile terminal 100, and/or an orientation or acceleration/deceleration of the mobile terminal 100.

The mobile terminal 100 may be configured as a slide-type mobile terminal. In such a configuration, the sensing unit 140 may sense whether a sliding portion of the mobile terminal 100 is opened or closed. The sensing unit 140 may also sense presence or absence of power provided by the power supply 190, presence or absence of a coupling or other connection between the interface unit 170 and an external device, etc.

The sensing unit 140 may include a proximity sensor 141.

The output unit 150 may generate an output relevant to a sight sense, an auditory sense, a tactile sense and/or the like. The output unit 150 may include a display 151, an audio output module 152, an alarm 153, a haptic module 154 and/or the like.

The display 151 may display (output) information processed by the terminal 100. For example, in case that the terminal is in a call mode, the display 151 may display a user interface (UI) or a graphic user interface (GUI) associated with the call. If the mobile terminal 100 is in a video communication mode or a photograph mode, the display 151 may display a photographed and/or received picture, a UI or a GUI.

The display 151 may include at least one of a liquid crystal display (LCD), a thin film transistor liquid crystal display (TFT LCD), an organic light-emitting diode (OLED), a flexible display, and a 3-dimensional display.

The display 151 may have a transparent or light-transmittive type configuration to enable an external environment to be seen through. This may be called a transparent display. A transparent OLED (TOLED) may be an example of a transparent display. A backside structure of the display 151 may also have the light-transmittive type configuration. In this configuration, a user may see an object located behind the terminal body through the area occupied by the display 151 of the terminal body.

At least two displays 151 may also be provided. For example, a plurality of displays may be provided on a single face of the terminal 100 by being built in one body or spaced apart from the single face. Alternatively, each of a plurality of displays may be provided on different faces of the terminal 100.

If the display 151 and a sensor for detecting a touch action (hereafter a touch sensor) are constructed in a mutual-layered structure (hereafter a touchscreen), the display 151 may be used as an input device as well as an output device. For example, the touch sensor may include a touch film, a touch sheet, a touchpad and/or the like.

The touch sensor may convert a pressure applied to a specific portion of the display 151 or a variation of electrostatic capacity generated from a specific portion of the display 151 to an electric input signal. The touch sensor may detect a pressure of a touch as well as a position and size of the touch.

If a touch input is provided to the touch sensor, signal(s) corresponding to the touch input may be transferred to a touch controller. The touch controller may process the signal(s) and then transfer corresponding data to the controller 180. The controller 180 may therefore know which portion of the display 151 is touched.

FIG. 1 shows that the proximity sensor 141 can be provided within the mobile terminal 100 enclosed by the touchscreen or around the touchscreen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have a longer durability than the contact type sensor and may also have a greater usage than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and/or the like. If the touchscreen is an electrostatic type, the proximity sensor 141 may detect proximity of a pointer using a variation of an electric field according to the proximity of the pointer. In this case, the touchscreen (touch sensor) may be classified into the proximity sensor.

An action in which a pointer approaches the touchscreen without contacting the touchscreen may be called a proximity touch. An action in which a pointer actually touches the touchscreen may be called a contact touch. The location of the touchscreen proximity-touched by the pointer may be the position of the pointer that vertically opposes the touchscreen when the pointer performs the proximity touch.

The proximity sensor 141 may detect a proximity touch and/or a proximity touch pattern (e.g., a proximity touch distance, a proximity touch duration, a proximity touch position, a proximity touch shift state, etc.). Information corresponding to the detected proximity touch action and/or the detected proximity touch pattern may be outputted to the touchscreen.

The audio output module 152 may output audio data that is received from the wireless communication unit 110 in a call signal reception mode, a call mode, a recording mode, a voice recognition mode, a broadcast receiving mode and/or the like. The audio output module 152 may output audio data stored in the memory 160. The audio output module 152 may output an audio signal relevant to a function (e.g., a call signal receiving sound, a message receiving sound, etc.) performed by the mobile terminal 100. The audio output module 152 may include a receiver, a speaker, a buzzer and/or the like.

The alarm 153 may output a signal for announcing an event occurrence of the mobile terminal 100. An event occurring in the mobile terminal 100 may include one of a call signal reception, a message reception, a key signal input, a touch input and/or the like. The alarm 153 may output a signal for announcing an event occurrence by way of vibration or the like as well as a video signal or an audio signal. The video signal may be outputted via the display 151. The audio signal may be outputted via the audio output module 152. The display 151 or the audio output module 152 may be classified as part of the alarm 153.

The haptic module 154 may bring about various haptic effects that can be sensed by a user. Vibration is a representative example for the haptic effect brought about by the haptic module 154. Strength and pattern of the vibration generated from the haptic module 154 may be controllable. For example, vibrations differing from each other may be outputted in a manner of being synthesized together or may be sequentially outputted.

The haptic module 154 may generate various haptic effects including a vibration, an effect caused by such a stimulus as a pin array vertically moving against a contact skin surface, a jet power of air via outlet, a suction power of air via inlet, a skim on a skin surface, a contact of an electrode, an electrostatic power and the like, and/or an effect by hot/cold sense reproduction using an endothermic or exothermic device as well as the vibration.

The haptic module 154 may provide the haptic effect via direct contact. The haptic module 154 may enable a user to experience the haptic effect via muscular sense of a finger, an arm and/or the like. Two or more haptic modules 154 may be provided according to a configuration of the mobile terminal 100.

The memory 160 may store a program for operations of the controller 180. The memory 160 may temporarily store input/output data (e.g., phonebook, message, still picture, moving picture, etc.). The memory 160 may store data of vibration and sound in various patterns outputted in case of a touch input to the touchscreen.

The memory 160 may include at least one of a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory, a programmable read-only memory, a magnetic memory, a magnetic disk, an optical disk, and/or the like. The mobile terminal 100 may operate in association with a web storage that performs a storage function of the memory 160 in the Internet.

The interface unit 170 may play a role as a passage to external devices connected to the mobile terminal 100. The interface unit 170 may receive data from an external device. The interface unit 170 may be supplied with a power and then the power may be delivered to elements within the mobile terminal 100. The interface unit 170 may enable data to be transferred to an external device from an inside of the mobile terminal 100. The interface unit 170 may include a wire/wireless headset port, an external charger port, a wire/wireless data port, a memory card port, a port for coupling to a device having an identity module, an audio input/output (I/O) port, a video input/output (I/O) port, an earphone port and/or the like.

The identity module may be a chip or card that stores various kinds of information for authenticating use of the mobile terminal 100. The identify module may include a user identity module (UIM), a subscriber identity module (SIM), a universal subscriber identity module (USIM) and/or the like. A device provided with the above identity module (hereafter an identity device) may be manufactured in the form of a smart card. The identity device may be connected to the mobile terminal 100 via the port.

The interface unit 170 may play a role as a passage for supplying a power to the mobile terminal 100 from a cradle that is connected to the mobile terminal 100. The interface unit 170 may play a role as a passage for delivering various command signals, which are inputted from the cradle by a user, to the mobile terminal 100. Various command signals inputted from the cradle or the power may work as a signal for recognizing that the mobile terminal 100 is correctly loaded in the cradle.

The controller 180 may control overall operations of the mobile terminal 100. For example, the controller 180 may perform control and processing relevant to a voice call, a data communication, a video conference and/or the like. The controller 180 may have a multimedia module 181 for multimedia playback. The multimedia module 181 may be implemented within the controller 180 or may be configured separate from the controller 180.

The controller 180 may perform pattern recognizing processing for recognizing a handwriting input performed on the touchscreen as a character an/or recognizing a picture drawing input performed on the touchscreen as an image.

The power supply 190 may receive an external or internal power and then supply the power required for operations of the respective elements under control of the controller 180.

Embodiments of the present disclosure explained in the following description may be implemented within a recording medium that can be read by a computer or a computer-like device using software, hardware or combination thereof.

According to the hardware implementation, arrangements and embodiments may be implemented using at least one of application specific integrated circuits (ASICs), digital signal processors (DSPs), digital signal processing devices DSPDs), programmable logic devices (PLDs), field programmable gate arrays (FPGAs), processors, controllers, microcontrollers, microprocessors and electrical units for performing other functions. In some cases, embodiments may be implemented by the controller 180.

For a software implementation, arrangements and embodiments described herein may be implemented with separate software modules, such as procedures and functions, each of which may perform one or more of the functions and operations described herein. Software codes may be implemented with a software application written in any suitable programming language and may be stored in memory such as the memory 160, and may be executed by a controller or processor, such as the controller 180.

Figure 2A:
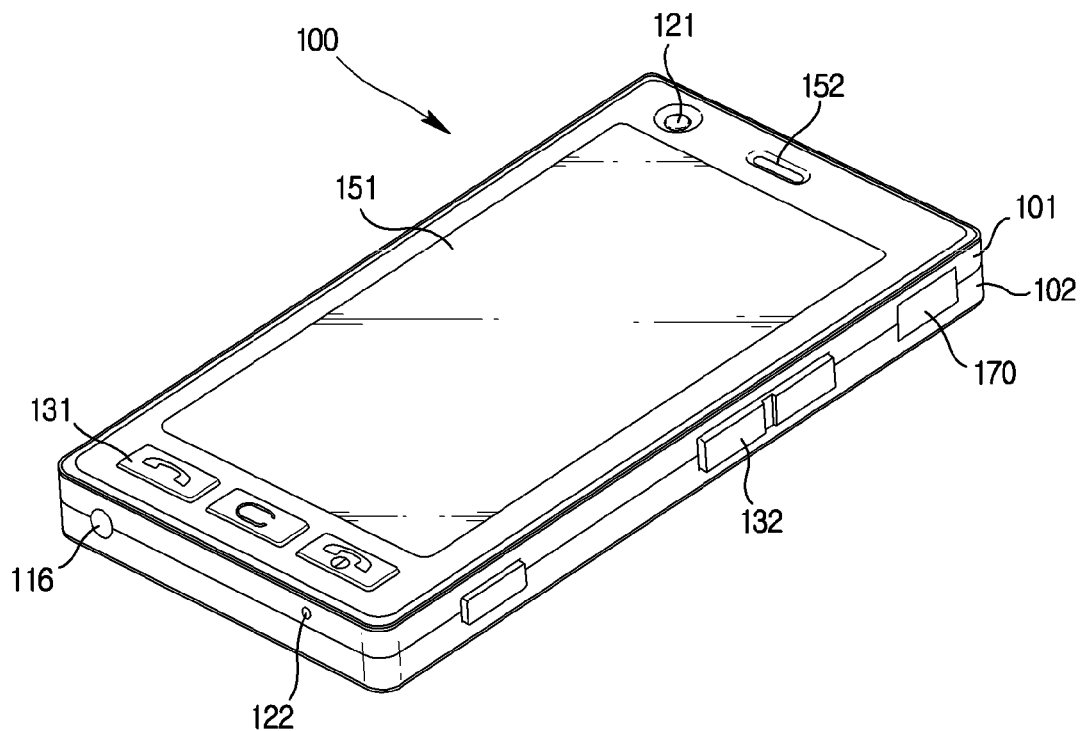
FIG. 2A is a front-view of a mobile terminal according to an example embodiment.

FIG. 2A is a front-view of a mobile terminal according to an example embodiment. Other embodiments, configurations and arrangements may also be provided.

As shown in FIG. 2A, the mobile terminal 100 may include a bar type terminal body. Embodiments of the mobile terminal may be implemented in a variety of different configurations. Examples of such configurations may include a folder-type, a slide-type, a bar-type, a rotational-type, a swing-type and/or combinations thereof.

The body may include a case (casing, housing, cover, etc.) that forms an exterior of the terminal. The case may be divided into a front case 101 and a rear case 102. Various electric/electronic parts may be provided in a space between the front case 101 and the rear case 102. A middle case may be further provided between the front case 101 and the rear case 102.

The cases may be formed by injection molding of synthetic resin or may be formed of a metal substance such as stainless steel (STS), titanium (Ti) or the like, for example.

The display 151, the audio output unit 152, the camera 121, manipulating units 131 and 132 the microphone 122, the interface unit 170 and the like may be provided on the terminal body, and more particularly on the front case 101.

The display 151 may occupy most of a main face of the front case 101. The audio output module 152 and the camera 121 may be provided at an area adjacent to one end portion of the display 151, while the user input unit 131 and the microphone 122 may be provided at another area adjacent to the other end portion of the display 151. The user input unit 132 and the interface unit 170 may be provided on lateral sides of the front and rear cases 101 and 102.

The manipulating units 131 and 132 may receive a command for controlling an operation of the mobile terminal 100. The manipulating units 131 and 132 may be included in the user input 130 of FIG. 1. The manipulating units 131 and 132 may be called a manipulating portion and may adopt any mechanism of a tactile manner that enables a user to perform a manipulation action by experiencing a tactile feeling.

Content inputted by the first manipulating unit 131 or the second manipulating unit 132 may be diversely set. For example, a command such as start, end, scroll and/or the like may be inputted to the first manipulating unit 131. A command for a volume adjustment of sound outputted from the audio output unit 152, a command for a switching to a touch recognizing mode of the display 151 or the like may be inputted to the second manipulating unit 132.

Figure 2B:
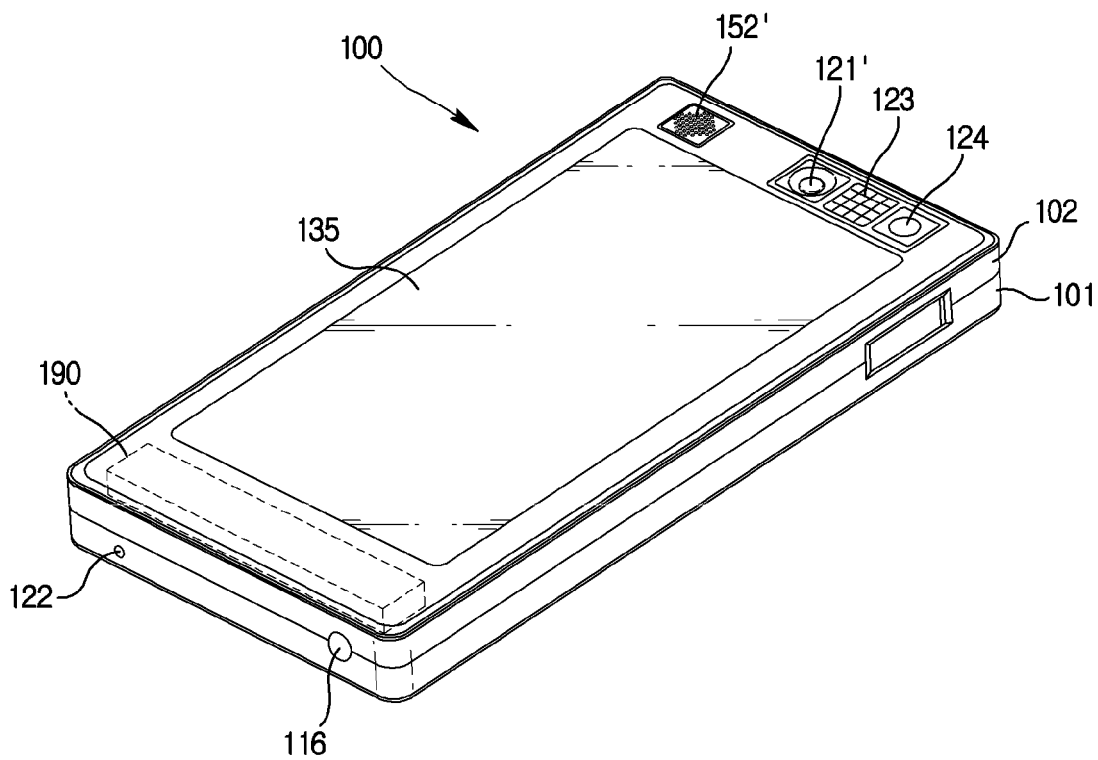
FIG. 2B is a perspective diagram of a backside of the mobile terminal shown in FIG. 2A.

FIG. 2B is a perspective diagram of a backside of the mobile terminal shown in FIG. 2A. Other embodiments, configurations and arrangements may also be provided.

As shown in FIG. 2B, a camera 121' may be additionally provided on a backside of the terminal body, and more particularly on the rear case 102. The camera 121' may have a photographing direction that is substantially opposite to a photographing direction of the camera 121 (shown in FIG. 2A) and may have pixels differing from pixels of the camera 121.

For example, the camera 121 may have a lower number of pixels to capture and transmit a picture of user's face for a video call, while the camera 121' may have a greater number of pixels for capturing a general subject for photography without transmitting the captured subject. Each of the cameras 121 and 121' may be installed on the terminal body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (self-photography) using the camera 121', the mirror 124 may enable the user to view a user's face reflected by the mirror 124.

An additional audio output unit 152' may be provided on the backside of the terminal body. The additional audio output unit 152' may implement a stereo function together with the audio output unit 152 shown in FIG. 2A and may be used for implementation of a speakerphone mode in talking over the terminal.

A broadcast signal receiving antenna 116 may be additionally provided at the lateral side of the terminal body as well as an antenna for communication or the like. The antenna 116 may be considered a portion of the broadcast receiving module 111 shown in FIG. 1 and may be retractably provided on the terminal body.

The power supply 190 for supplying a power to the mobile terminal 100 may be provided to the terminal body. The power supply 190 may be built within the terminal body. Alternatively, the power supply 190 may be detachably connected to the terminal body.

FIG. 2B also shows a touchpad 135 for detecting a touch that is additionally provided on the rear case 102. The touchpad 135 may be configured in a light transmittive type like the display 151. If the display 151 outputs visual information from both faces, the display 151 may recognize visual information via the touchpad 135 as well. The information outputted from both of the faces may be controlled by the touchpad 135. Alternatively, a display may be further provided to the touchpad 135 so that a touchscreen may also be provided to the rear case 102.

The touchpad 135 may be activated by interconnecting with the display 151 of the front case 101. The touchpad 135 may be provided in rear of the display 151 in parallel to one another. The touchpad 135 may have a size equal to or less than a size of the display 151.

Interconnected operational mechanism between the display 151 and the touchpad 135 may now be explained with reference to FIGS. 3A and 3B.

Figure 3A:
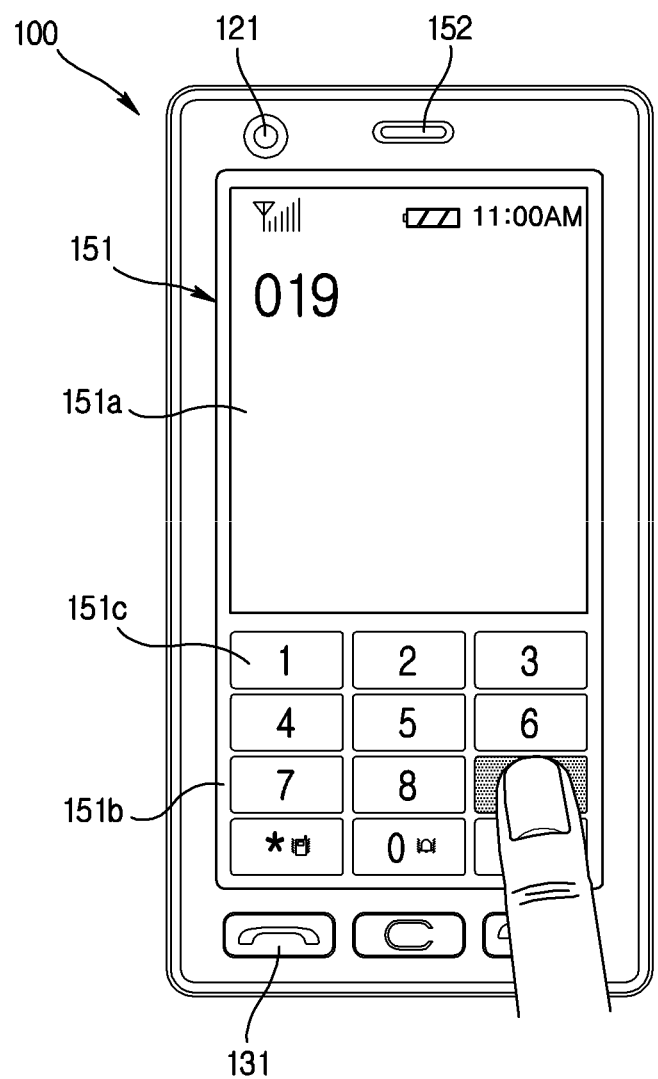
FIGS. 3A and 3B are front-view diagrams of a mobile terminal according to an example embodiment.
Figures 3B, 4:
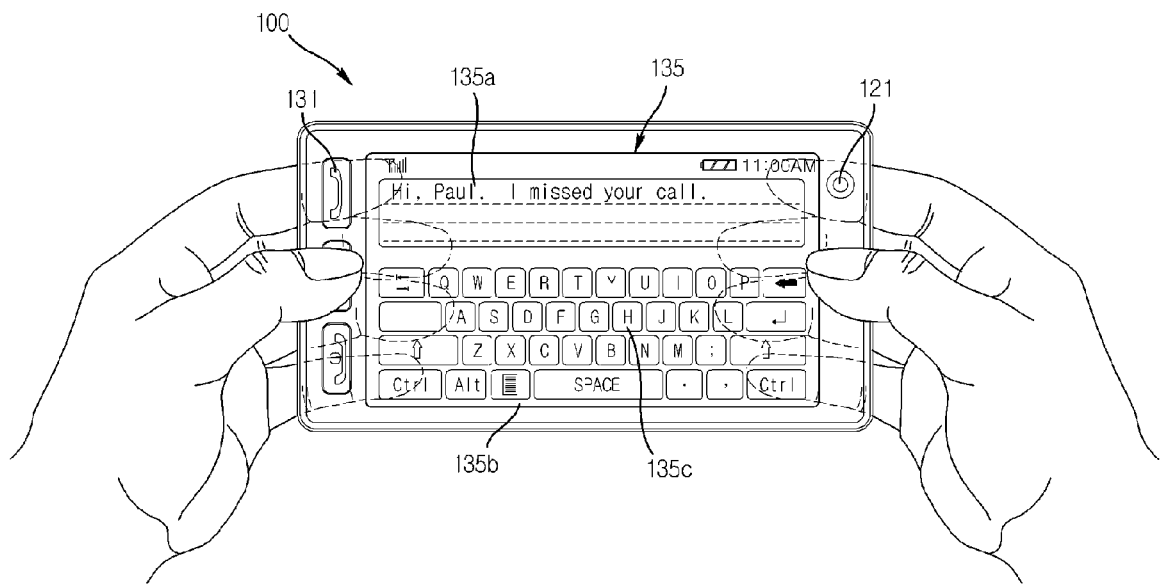
FIG. 4 is a diagram for showing a table which is used in the method for inputting a command in a mobile terminal, according to the one embodiment of the present disclosure.

FIGS. 3A and 3B are front-view diagrams of a mobile terminal according to an example embodiment. Other embodiments, configurations and arrangements are also within the scope of the present disclosure.

Various kinds of visual information may be displayed on the display 151. The displayed information may be characters, numerals, symbols, graphics, icons and/or the like.

In order to input the information, at least one of the characters, numerals, symbols, graphics and icons may be represented as a single predetermined array to be implemented in a keypad formation. The keypad formation may be called soft keys.

FIG. 3A shows that an input touch may be applied to a soft key through a front face of a terminal body.

The display 151 may be operable through an entire area or may be divided into a plurality of regions. The plurality of the regions may be configured to be interoperable.

An output window 151a may be displayed on a top portion of the display 151 and an input window 151b may be displayed on a bottom portion of the display 151. A soft key 151c representing a digit for inputting a phone number or the like may be output to the input window 151b. If the soft key 151c is touched, a digit corresponding to the touched soft key may be outputted to the output window 151a. If the first manipulating unit 131 is manipulated, a call connection for a phone number displayed on the output window 151a may be attempted.

FIG. 3B shows that an input touch may be applied to a soft key through a rear face of a terminal body. FIG. 3A shows that the terminal body is vertically arranged (i.e., in a portrait manner). FIG. 3B shows that the terminal body is horizontally arranged (i.e., in a landscape manner). The display 151 may change an orientation of an output picture according to the arranged direction of the terminal body.

FIG. 3B also shows that a text input mode is activated in the mobile terminal 100. FIG. 3B shows that the touchscreen 135 may include an output window 135a and an input window 135b. The output window 135a and the input window 135b may be displayed on the display 151. A plurality of soft keys 135c representing characters, symbols and/or digits may be arranged in the input window 135b. The soft keys 135c may be arranged in a QWERTY key formation.

If the soft keys 135c are touched using the touchpad 135, the characters, symbols and/or digits corresponding to the touched soft keys may be outputted to the output window 135a. Touch input via the touchpad 135 may be advantageous in that the soft keys 135c may be prevented from being blocked by a finger in case of touch, which is compared to the touch input via the display 151. If the display 151 and the touchpad 135 are transparent, the mobile terminal 100 may visually check or determine whether fingers are located at the backside of the terminal body. Hence, more correct touch inputs may be made.

The display 151 and/or the touchpad 135 may receive a touch input by scrolling. A user may scroll the display 151 or the touchpad 135 to shift a cursor or pointer located at an entity (e.g., icon or the like) displayed on the display 151. If a finger is shifted on the display 151 or the touchpad 135, a path of the shifted finger may be visually displayed on the display 151. This may be useful in editing an image displayed on the display 151.

If both the display (touchscreen) 151 and the touchpad 135 are touched together within a predetermined amount of time, a particular function of the mobile terminal 100 can be executed. The simultaneous touch may correspond to a case that the terminal body is held by a user using a thumb and a first finger (clamping). The function may include activation or deactivation for the display 151 or the touchpad 135.

On the other hand, it is assumed that the display unit 151 is a touch screen.

In the following description, the drawing pattern table which is stored in the mobile terminal where the method for inputting a command in the mobile terminal according to the present disclosure is applied will be explained, referring to FIG. 4.

FIG. 4 is a diagram for showing a table which is used in the method for inputting a command in a mobile terminal, according to the one embodiment of the present disclosure.

As shown in FIG. 4, various types of the drawing patterns and commands according to the drawing patterns are stored in the memory 160 of the mobile terminal 100. Reference No. 11 is a drawing pattern for multiplication, and reference No. 12 is a drawing pattern for search. The drawing pattern for search is admitted only when the drawing pattern exists in a square. Reference No. 13 is a drawing pattern for reducing the brightness of the display unit, reference No. 14 is a drawing pattern for increasing the brightness of the display unit, reference No. 15 is a drawing pattern for generating a folder, reference No. 16 is a drawing pattern for spacing, 11 is a drawing pattern for multiplication, reference No. 17 is a drawing pattern for removing a character, reference No. 18 is a drawing pattern for removing a paragraph, reference No. 19 is a drawing pattern for no space, and reference No. 20 is a drawing pattern for help mode.

FIG. 4 is only embodiment for inputting a command in a mobile terminal. The present disclosure is not limited to the FIG. 4. The more drawing patterns and commands according to the drawing patterns may be stored in the memory 160 by the user's set up or by the producer's set up.

In the following description, a method for inputting a command in the mobile terminal having a memory storing the table as shown in FIG. 4 will be explained, referring to FIG. 5 and FIG. 6.

Figure 5:
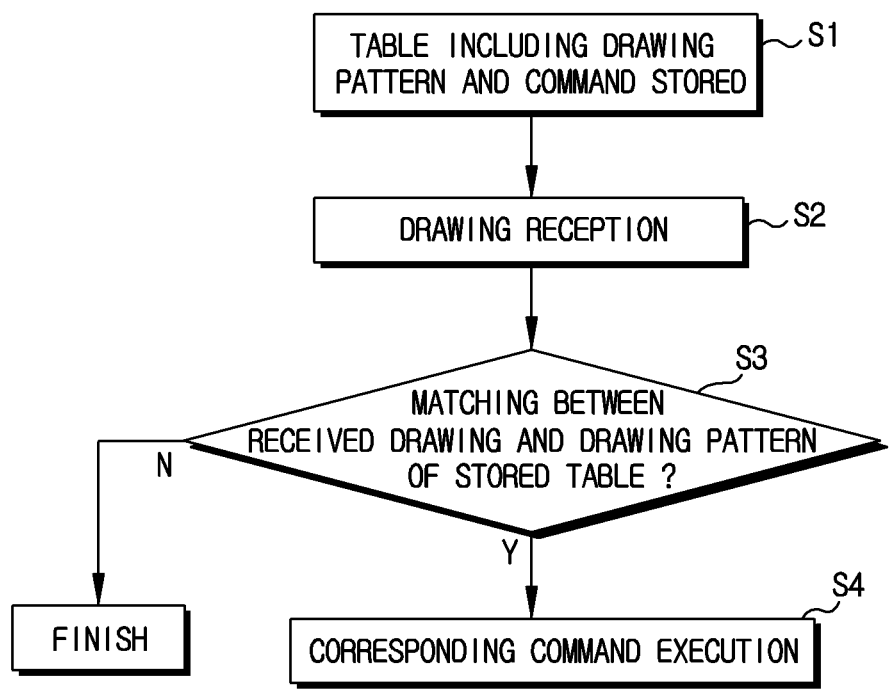
FIG. 5 is a flow chart for explaining a first embodiment in the method for inputting a command in the mobile terminal, according to the present disclosure.
Figure 6:
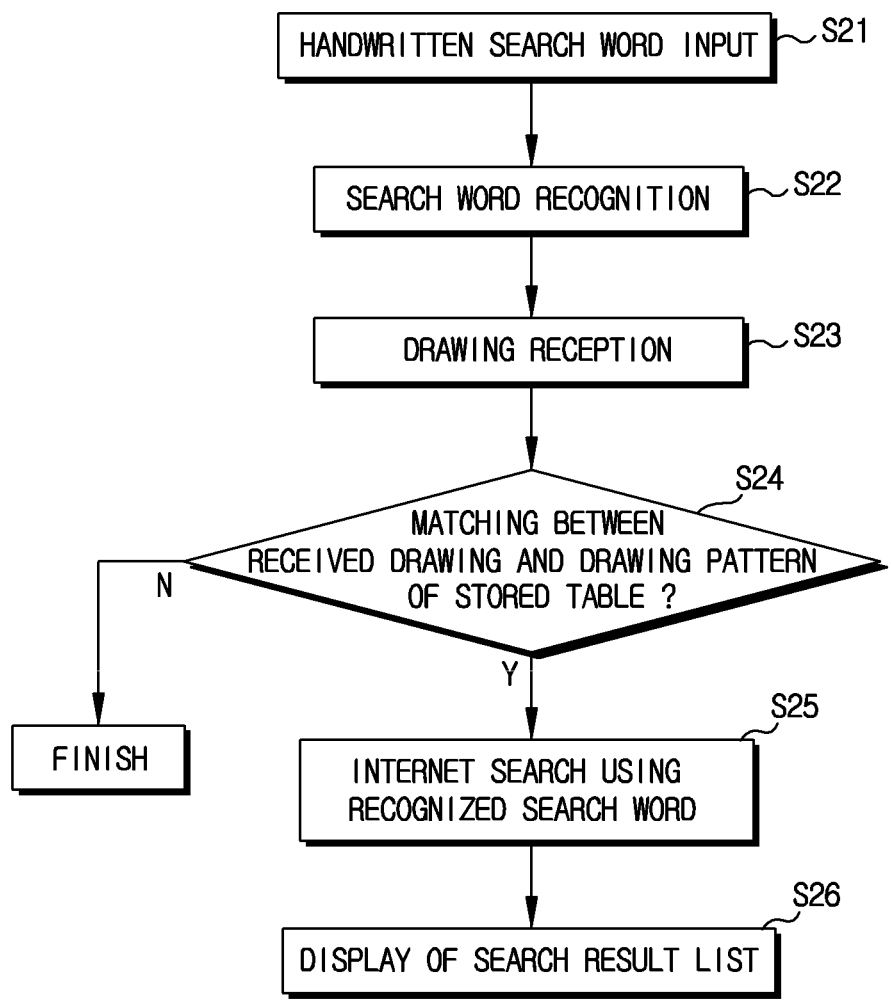
FIG. 6 is a flow chart for explaining a second embodiment in the method for inputting a command in the mobile terminal, according to the present disclosure.

FIG. 5 is a flow chart for explaining a first embodiment in the method for inputting a command in the mobile terminal, according to the present disclosure, and FIG. 6 is a flow chart for explaining a second embodiment in the method for inputting a command in the mobile terminal, according to the present disclosure.

As shown in FIG. 5, at first, the table including a drawing pattern and a command according to the drawing pattern (referring to FIG. 4) is stored in the memory 160 of the mobile terminal 100 (S1). The user may set up the more drawing patterns and commands according to the patterns through the specific menu. If the user inputs a drawing on the touch screen (touch sensor) by using the pointing device such as finger and stylus pen, the touch screen may receive the user's drawing (S2). Then, the controller confirms that the received drawing is matched with the drawing pattern stored in the memory 160 (S3). If the matched drawing pattern exists, the command corresponding to the pattern is executed (S4). Furthermore, if other drawing is inputted within the predetermined time, the function corresponding to this is executed. If the matched drawing pattern is not found, the drawing command receiving mode may be terminated.

According to the first embodiment of the present disclosure, the user may input the command by drawing a specific pattern. In the following description, the specific drawing pattern and the operation of the mobile terminal according the specific drawing pattern will be described, referring to FIG. 7 to FIG. 10.

FIG. 6 is a flow chart for explaining a second embodiment in the method for inputting a command in the mobile terminal, according to the present disclosure.

As shown in FIG. 6, at first, the table including a drawing pattern and a command according to the drawing pattern is stored in the memory 160 of the mobile terminal 100. The user may input a search word in the mobile terminal 100 storing the table comprising a drawing pattern and a command according to the drawing pattern (S21). The search word may be inputted through the key pad or through the handwriting on the touch screen. If the search word is inputted through the handwriting on the touch screen, the controller 180 recognizes the search word (S22). At this time, if the search word is not recognized, the controller may display a warning message on the touch screen to inform that the search word is not recognized. Then, the user draws the same or similar shape as that of the drawing pattern corresponding to the 'search' on the touch screen. The touch screen receives the user's drawing (S23). The controller 180 compares the received drawing with the search drawing pattern included in the table which is stored in the memory 160 to confirm whether the drawing is the same or similar with the search drawing pattern (S24). If the received drawing is matched with the search drawing pattern, the controller may search the memory 160 with the recognized search word or execute an internet search after accessing an external server (S25). At this time, the user may set up the search site used in the search. Alternatively, the range of the search may be set up previously in case that the memory is searched. After the search is completed, the controller 180 displays the search result list on the display unit 151 (S26).

According to the second embodiment of the present disclosure, the user may easily obtain the information that the user wants, by inputting a search word and an appointed pattern.

Figure 7:
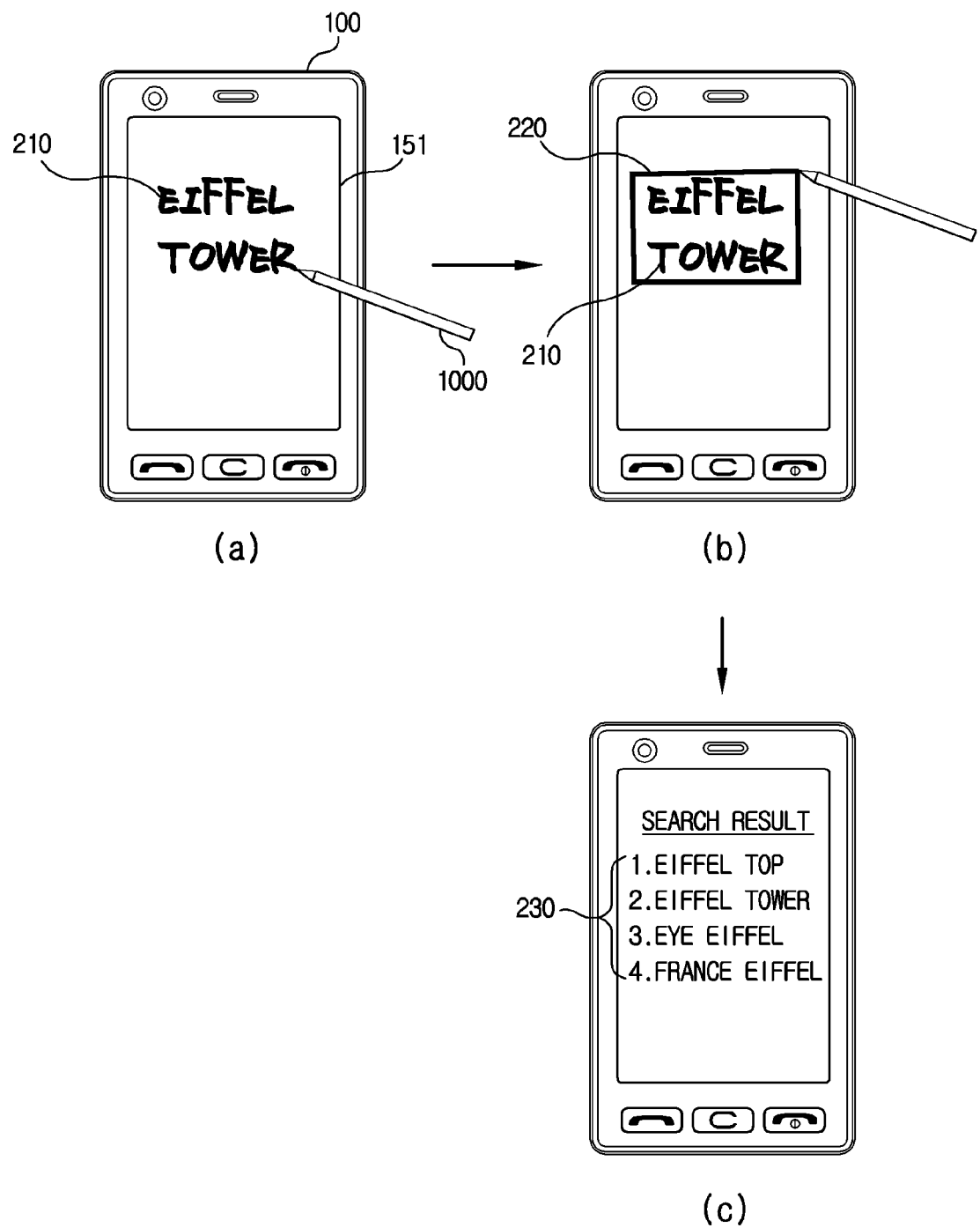
FIG. 7 is an image diagram where the method for searching a search word is applied in the method for inputting a command in a mobile terminal, according to the present disclosure.
Figure 9:
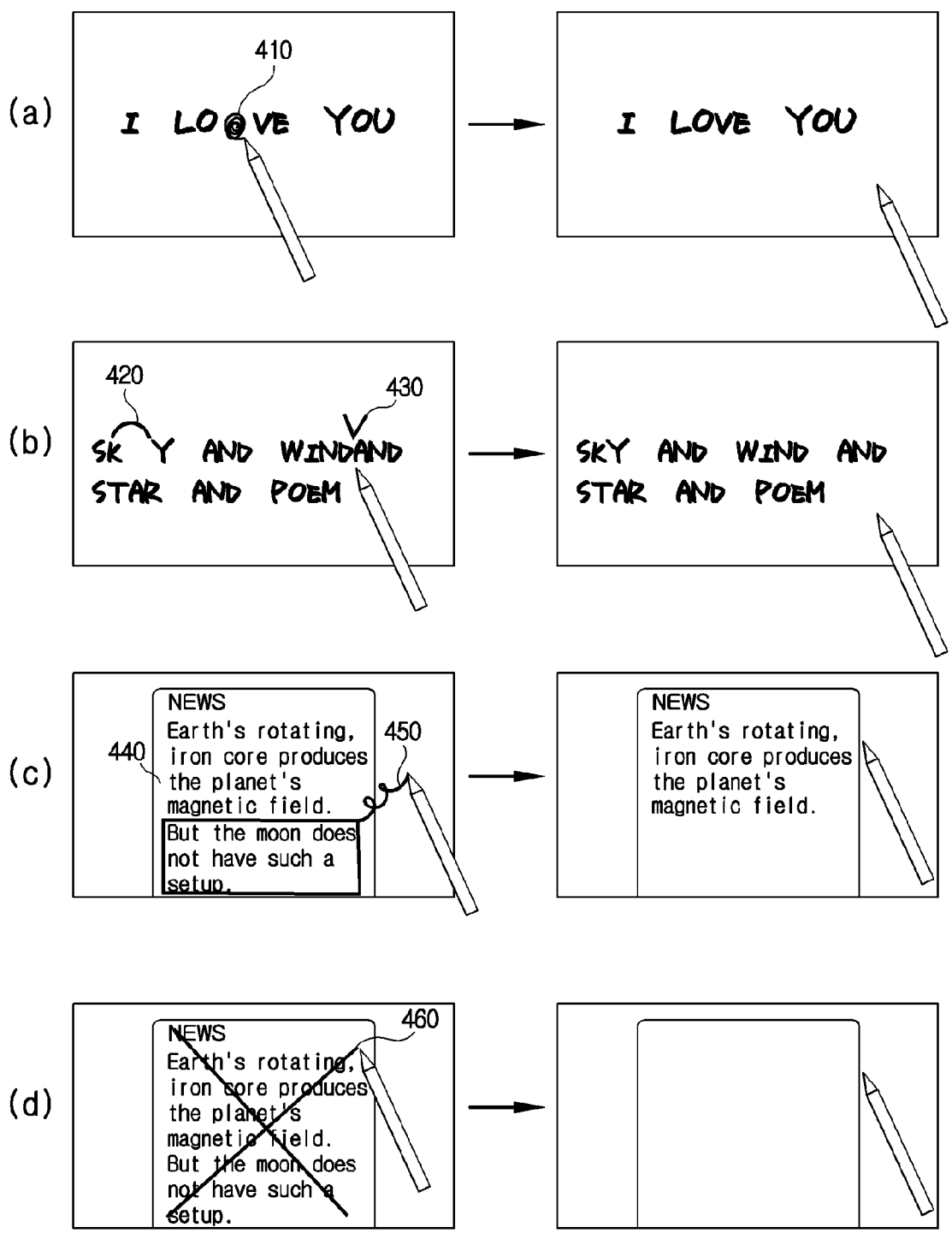
FIG. 9 is an image diagram where the method for revising and editing a character is applied in the method for inputting a command in a mobile terminal, according to the present disclosure.
Figure 10:
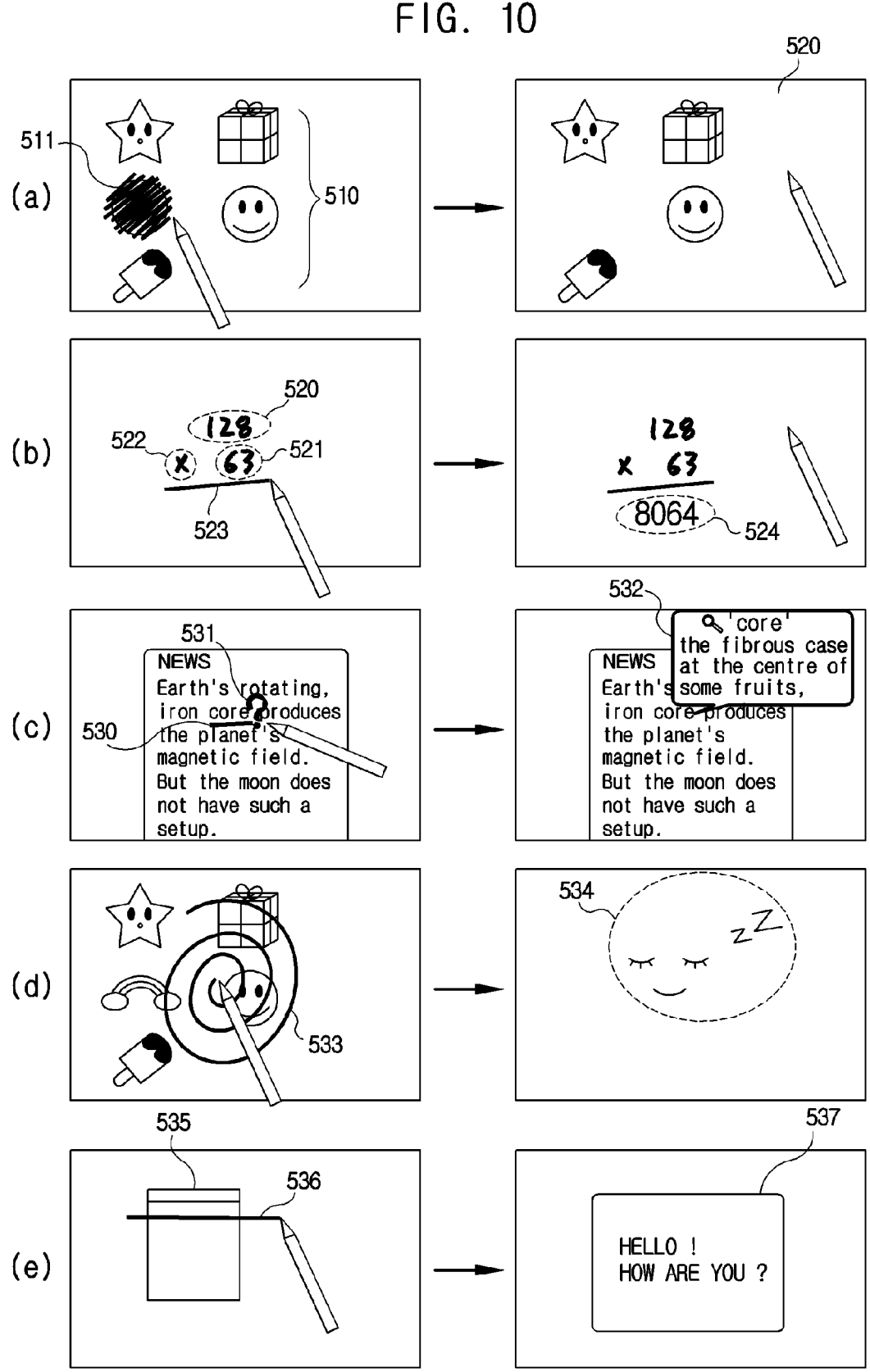
FIG. 10 is an image diagram for showing various implementations where the method for inputting a command in a mobile terminal is applied, according to the present disclosure.

In the following description, various implementation will be described with image diagrams of the mobile terminal along with the first embodiment and the second embodiment. FIG. 7 is an image diagram where the method for searching a search word is applied in the method for inputting a command in a mobile terminal, according to the present disclosure, FIG. 8 is an image diagram where the method for controlling a brightness of a display unit is applied in the method for inputting a command in a mobile terminal, according to the present disclosure, FIG. 9 is an image diagram where the method for revising and editing a character is applied in the method for inputting a command in a mobile terminal, according to the present disclosure, and FIG. 10 is an image diagram for showing various implementations where the method for inputting a command in a mobile terminal is applied, according to the present disclosure.

FIG. 7A illustrates a display unit 151 of the mobile terminal 100. The user handwrite a search word, 'Eiffel Tower' by using the pointing device 1000. At this time, as aforementioned, the search word may be inputted by the keypad or the virtual key pad on the touch screen. At this time, as shown in FIG. 7B, the user draws the rectangular 220 around the search word 210. The rectangular 220, as described in FIG. 4, may be the same as or similar with the drawing pattern representing the search. The controller 180 compares the received drawing with the table stored in the memory 160 and search the same or similar drawing pattern. Then, the mobile terminal may be controlled by the command corresponding to the drawing pattern. In this case, since reference No. 12 is similar with the rectangular 220, the controller 180 progress the search with the search word 210. This search may be one of an internet search or the search for the memory 160. The order of the FIG. 7A's step and the FIG. 7B's step may be reversed. Namely, if the search word is inputted after the rectangular 210 which corresponds to the internet search is drawn, the internet search may be done. FIG. 7C illustrates the internet search result list 230. The user may obtain the information that he wants by selecting one item of the internet search result list. At this time, the user may be select the hyper-linked item by the pointing device, or by the navi-key. Furthermore, the present embodiment may be done on the wall paper. Then, instead that the user makes the internet search by inputting the search word after accessing the internet through a specific menu, the user may progress the internet search by drawing the search word and the search drawing on the wall paper.

Figure 8:
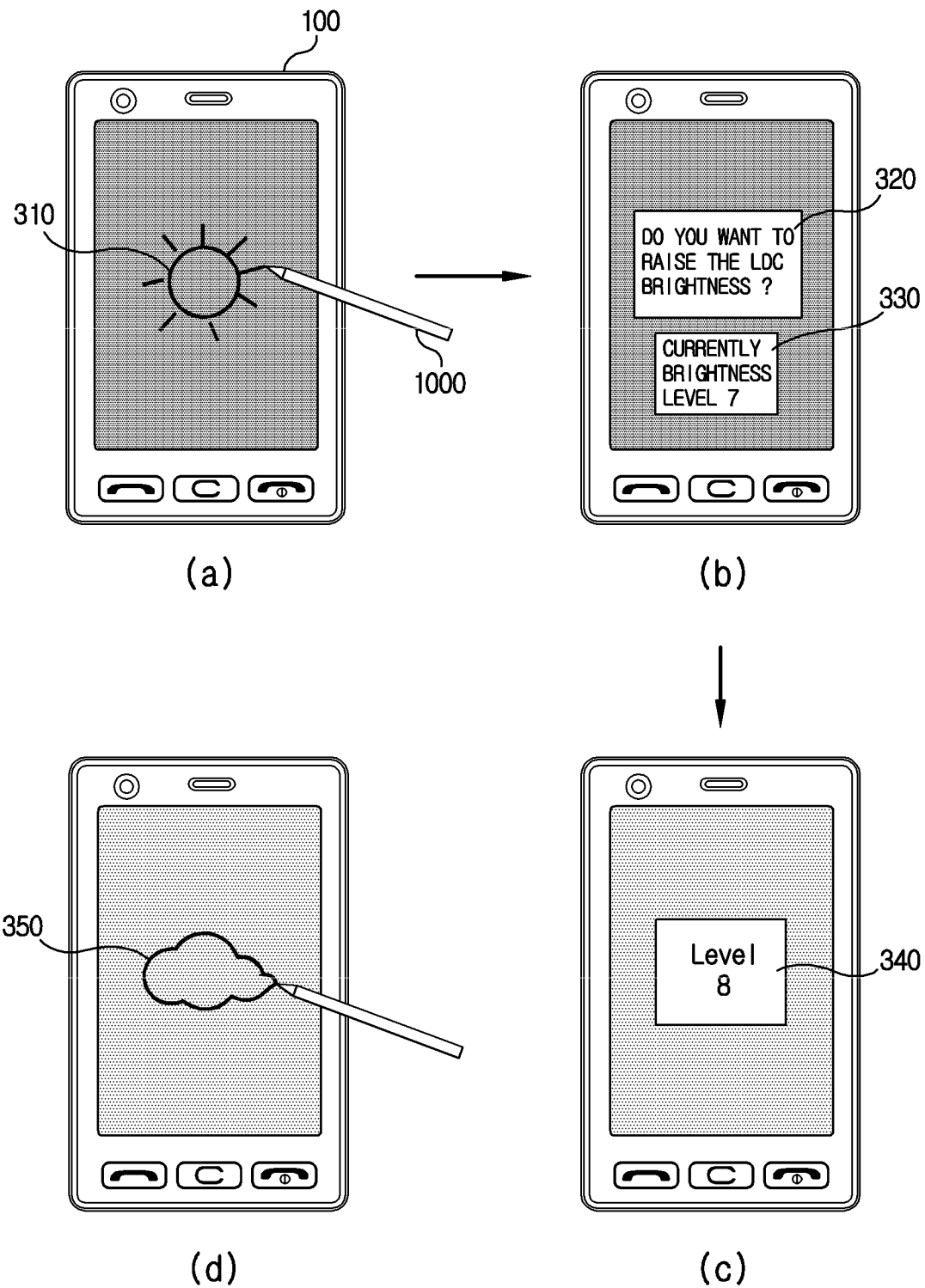
FIG. 8 is an image diagram where the method for controlling a brightness of a display unit is applied in the method for inputting a command in a mobile terminal, according to the present disclosure.

FIG. 8 is an image diagram where the method for controlling a brightness of a display unit is applied in the method for inputting a command in a mobile terminal, according to the present disclosure, FIG. 8A illustrate a display unit 151 of the mobile terminal 100. The user draws the "sun" shape 310 on the display unit by using the pointing device 1000. The "sun" shape 310, as shown in FIG. 4 is the same as or similar with the drawing pattern representing the LCD brightness raise 14. The controller 180 compares the received drawing with the table stored in the memory 160 and search the same or similar drawing pattern. Then, the mobile terminal may be controlled by the command corresponding to the drawing pattern. In this case, since reference No. 14 is similar with the 'sun' shape 310, the controller 180 raise the LCD brightness if the sun shape 310 is received. At this time, as shown in FIG. 8B, the current brightness level 330 may be displayed with the message 320, 'Do you want to raise the LCD brightness?' In this state, the user may manipulate the key pad or the brightness level 330 to change the level of the brightness. The raises brightness level 340 may be displayed on separate window, referring to FIG. 8C. Alternatively, instead of FIGS. 8B and 8C, the brightness of the display unit is automatically raised as soon as the sun shape is drawn.

FIG. 8D illustrates the cloud 350. The cloud 350, as shown in FIG. 4, is the same as or similar with the LCD dropping pattern 13 representing to drop the brightness of the display unit. The controller 180 compares the received drawing with the table stored in the memory 160 to find the same pattern or similar patter with the received drawing. Then, the mobile terminal is controlled by the command corresponding to the drawing pattern. Therefore, the controller drops the brightness of the display unit if the cloud 310 drawing is received.

FIG. 8 illustrates an example where the LCD brightness is changed by the received drawing. The present disclosure is not limited to the example. This example may be used in controlling the volume or the bell sound.

FIG. 9 is an image diagram where the method for revising and editing a character is applied in the method for inputting a command in a mobile terminal, according to the present disclosure.

FIG. 9A illustrates the removing the character which is an element of the sentence. As shown in left diagram of FIG. 9A, rubbing gesture such as reference No. 17 is inputted on one character 410 in the sentence by using the pointing device. Then, the controller 180 recognizes the rubbing gesture (rubbing drawing) as the remove of the character to display the sentence where the character is removed on the display unit 151, referring to the right diagram of FIG. 9A.

FIG. 9B illustrates the example where the element of the sentence is revised by the symbol. As shown in left diagram of FIG. 9B, the user draws a symbol for no space 420 and a symbol for spacing 430. Then, the controller 180 recognizes these symbols to revise the sentence according to the symbols, referring to the right diagram of FIG. 9B.

FIG. 9B illustrates the example where the element of the sentence is revised by the symbol. As shown in left diagram of FIG. 9B, the user draws a symbol for no space 420 and a symbol for spacing 430. Then, the controller 180 recognizes these symbols to revise the sentence according to the symbols, referring to the right diagram of FIG. 9B.

FIG. 9C illustrates the example where the paragraph 440 is removed. As shown in left diagram of FIG. 9C, if the user draws a rectangular block around the paragraph and the remove symbol 450 by using the pointing device, the controller 180 recognizes these drawings as the remove the assigned paragraph. The text where the assigned paragraph is removed is displayed on the display unit 151, referring to the right diagram of FIG. 9C.

FIG. 9D illustrates the example where the entire page is removed. As shown in left diagram of FIG. 9D, if the user draws the delete symbol 460 by using the pointing device, the controller 180 recognizes this symbol as the entire page delete to display the removed state, referring to the right diagram of FIG. 9D.

FIG. 10 is an image diagram for showing various implementations where the method for inputting a command in a mobile terminal is applied, according to the present disclosure.

FIG. 10A illustrates an example where the folder is removed. As shown in left diagram of FIG. 10A, if the user draws the remove symbol (rubbing gesture) for the plurality of folders 510 (or icons, or files) by using the pointing device. Then, the controller 180 recognizes this symbol as the folder remove to remove the folder, referring to the right diagram of FIG. 10A.

FIG. 10B illustrates the example where the arithmetic operation is executed. As shown in left diagram of FIG. 10B, if the user in sequence draws a first number 520, a second number 521, a multiplication 522, and a calculating symbol 523. Then the controller 180 recognizes these symbols to execute calculation. Then the controller 180 displays the result value 524 on the display unit 151, referring to the right diagram of FIG. 10B. In this implementation, the multiplication is exemplified. The present disclosure is not limited to the multiplication. The arithmetic operation may be used.

FIG. 10C illustrates the example where the help function is executed. As shown in left diagram of FIG. 10C, if the user draws underline 530 where the user questions, and then, draws the question mark 531, the controller 180 recognizes the underlined portion and the question mark to execute the help function on the underlined portion or to progress internet search to display the result on the separate window 532, referring to the right diagram of FIG. 10C.

FIG. 10D illustrates the example of the stand-by-mode. As shown in left diagram of FIG. 10D, if the user draws the symbol 533 for entering a stand-by mode by using the pointing device, then, the controller 180 recognizes this symbol to enter the stand-by mode. Then, the display unit 151 turns off or a specific image 534 is displayed on the display unit 151, referring to the right diagram of FIG. 9D.

FIG. 10E illustrates the example of a text message. As shown in left diagram of FIG. 10E, if the user draws the symbol 536 which penetrates the text message icon 535 by using the pointing device, the controller 180 recognizes this symbol to open the text message and displays the contents 537 on display unit, referring to the right diagram of FIG. 10E. The present disclosure illustrates the example of the text message. The present disclosure is not limited to the text message. The still image, the moving image or the execution file may be applied.

The above-described methods can be implemented in a program recorded medium as computer-readable codes. The computer-readable media may include all kinds of recording devices in which data readable by a computer system are stored. The computer-readable media include ROM, RAM, CD-ROM, magnetic tapes, floppy discs, optical data storage devices, and the like for example and also include carrier-wave type implementations (e.g., transmission via Internet).

Thus, it is intended that embodiments of the present disclosure may cover the modifications and variations of this disclosure provided they come within the scope of the appended claims and their equivalents.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method for searching performed in a mobile terminal having a touchscreen, the method comprising:
 displaying, on the touchscreen, a background, wherein all of the background is a uniform color;
 receiving a first input of a drawing pattern at the touchscreen at an area where the background is displayed;
 displaying, on the touchscreen, a visual trace of the drawing pattern at the area where the background is displayed;

receiving a second input of a handwritten term at the touchscreen at the area where the background is displayed, wherein the receiving of the second input occurs after the receiving of the first input;

displaying, on the touchscreen, a visual trace of the handwritten term at the area where the background is displayed, wherein the visual trace of the handwritten term is surrounded by the visual trace of the drawing pattern;

comparing the received drawing pattern with pattern data to identify whether the received drawing pattern matches a command pattern that is included in the pattern data, wherein the pattern data includes a plurality of patterns each respectively associated with one of a plurality of commands, wherein the command pattern is associated with a search command, and wherein the pattern data is stored in memory prior to the receiving of the first input;

initiating a search for a term that represents the received handwritten term in response to the receiving of the handwritten term and when the received drawing pattern matches the command pattern, wherein the search takes no input from information displayed on the background other than the received handwritten term;

terminating the displaying of the visual trace of the drawing pattern, and the visual trace of the handwritten term, in response to the initiated search; and displaying after the terminating, on the touchscreen, a search result according to results of the initiated search, wherein the search result includes a plurality of items which relate to the term that represents the received handwritten term, wherein each of the plurality of items comprise data that relates to the term that represents the received handwritten term and is a hyperlink to content that is accessible via a network, and wherein the plurality of items are displayed as an ordered list successively arranged in a vertical manner relative to a viewing orientation of the touchscreen.

2. The method of claim 1, wherein the pattern data and the search command are set via a displayed menu.

3. The method of claim 1, further comprising:
displaying, on the touchscreen, a warning message when the received handwritten term is not recognized as a search term.

4. The method of claim 1, wherein a location for performing the search is set via user input.

5. The method of claim 1, wherein a location for performing the search is in memory located at the mobile terminal.

6. The method of claim 1, wherein a location for performing the search is a network.

7. The method of claim 1, wherein the drawing pattern is received at the touchscreen at a location that is adjacent to where the handwritten term is received.

8. The method of claim 1, further comprising:
selecting an item of the plurality of items of the search result in response to a user input.

9. The method of claim 1, further comprising:
controlling volume or a bell sound in response to the receiving of the drawing pattern.

10. A mobile terminal, comprising:
a memory;
a touchscreen; and
a controller configured to:
cause the touchscreen to display a background, wherein all of the background is a uniform color;
receiving, via the touchscreen, a first input of a drawing pattern at an area where the background is displayed;
cause the touchscreen to display a visual trace of the drawing pattern at the area where the background is displayed;
receiving, via the touchscreen, a second input of a handwritten term at the area where the background is displayed, wherein the receiving of the second input occurs after the receiving of the first input;
cause the touchscreen to display a visual trace of the handwritten term at the area where the background is displayed, wherein the visual trace of the handwritten term is surrounded by the visual trace of the drawing pattern;
comparing the received drawing pattern with pattern data to identify whether the received drawing pattern matches a command pattern that is included in the pattern data, wherein the pattern data includes a plurality of patterns each respectively associated with one of a plurality of commands, wherein the command pattern is associated with a search command, and wherein the pattern data is stored in the memory prior to the receiving of the first input;
initiate a search for a term that represents the received handwritten term in response to the receiving of the handwritten term and when the received drawing pattern matches the command pattern, wherein the search takes no input from information displayed on the background other than the received handwritten term;
cause the touchscreen to terminate the displaying of the visual trace of the drawing pattern, and the displaying of the visual trace of the handwritten term, in response to the initiated search; and
cause the touchscreen to display, after the terminating of the displaying of the visual trace of the drawing pattern and the visual trace of the handwritten term, a search result according to results of the initiated search, wherein the search result includes a plurality of items which relate to the term that represents the received handwritten term, wherein each of the plurality of items comprise data that relates to the term that represents the received handwritten term and is a hyperlink to content that is accessible via a network, and wherein the plurality of items are displayed as an ordered list successively arranged in a vertical manner relative to a viewing orientation of the touchscreen.

11. The mobile terminal of claim 10, wherein the pattern data and the search command are set via a displayed menu.

12. The mobile terminal of claim 10, wherein the controller is further configured to:
cause the touchscreen to display a warning message when the received handwritten term is not recognized as a search term.

13. The mobile terminal of claim 10, wherein a location for performing the search is set via user input.

14. The mobile terminal of claim 10, wherein a location for performing the search is in memory located at the mobile terminal.

15. The mobile terminal of claim 10, wherein a location for performing the search is a network.

16. The mobile terminal of claim 10, wherein the drawing pattern is received at the touchscreen at a location that is adjacent to where the handwritten term is received.

17. The mobile terminal of claim 10, wherein the controller is further configured to:
select an item of the plurality of items of the search result in response to a user input.

18. The mobile terminal of claim 10, wherein the controller is further configured to:
   control a volume or a bell sound in response to the receiving of the drawing pattern.

* * * * *